(12) United States Patent
Mine et al.

(10) Patent No.: US 8,900,108 B2
(45) Date of Patent: Dec. 2, 2014

(54) SHEET CONVEYING ROLLER AND RUBBER COMPOSITION

(75) Inventors: Akihiro Mine, Kobe (JP); Yasuchika Ito, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 78 days.

(21) Appl. No.: 13/611,049

(22) Filed: Sep. 12, 2012

(65) Prior Publication Data

US 2013/0109553 A1 May 2, 2013

(30) Foreign Application Priority Data

Oct. 26, 2011 (JP) ................................. 2011-235261

(51) Int. Cl.
| | | |
|---|---|---|
| F16C 13/00 | (2006.01) | |
| B65H 27/00 | (2006.01) | |
| C08L 23/16 | (2006.01) | |
| C08J 3/24 | (2006.01) | |
| C08L 15/00 | (2006.01) | |
| C08L 7/00 | (2006.01) | |
| C08C 19/06 | (2006.01) | |

(52) U.S. Cl.
CPC .............. *B65H 27/00* (2013.01); *C08J 2323/16* (2013.01); *C08J 2319/00* (2013.01); *B65H 2404/531* (2013.01); *B65H 2801/06* (2013.01); *C08J 2307/00* (2013.01); *B65H 2801/15* (2013.01); *C08L 7/00* (2013.01); *C08J 2315/00* (2013.01); *C08C 19/06* (2013.01); *B65H 2701/1912* (2013.01); *C08L 23/16* (2013.01); *C08J 3/24* (2013.01); *C08L 15/00* (2013.01); *B65H 2401/111* (2013.01)
USPC .................................. 492/59; 492/56; 492/53

(58) Field of Classification Search
CPC ............ F16C 13/00; B65H 5/06; B65H 3/06; B65H 3/0638; B65H 27/00
USPC .......................................... 492/59, 56, 53, 48
See application file for complete search history.

(56) References Cited

U.S. PATENT DOCUMENTS

| | | | | |
|---|---|---|---|---|
| 4,621,121 A | * | 11/1986 | Schwarze et al. ........... | 525/329.3 |
| 4,673,741 A | * | 6/1987 | Schwarze et al. ........... | 544/209 |
| 5,037,872 A | * | 8/1991 | Schwarze et al. ........... | 524/262 |
| 5,206,304 A | * | 4/1993 | Hellwig et al. ............. | 525/329.3 |

(Continued)

FOREIGN PATENT DOCUMENTS

| | | |
|---|---|---|
| JP | 7-41603 A | 2/1995 |
| JP | 2005-120147 A | 5/2005 |

(Continued)

*Primary Examiner* — Essama Omgba
(74) *Attorney, Agent, or Firm* — Birch, Stewart, Kolasch & Birch, LLP

(57) ABSTRACT

The present invention provides a sheet conveying roller which requires a smaller number of ingredients than a prior art sheet conveying roller, has an excellent weather resistance, is less liable to suffer from reduction in friction coefficient attributable to accumulation of paper dust and sheet conveying failure attributable to the reduction in friction coefficient, and ensures proper sheet conveyance for a longer period of time. The invention further provides a rubber composition for the sheet conveying roller. The rubber composition comprises an ethylene-propylene-diene rubber and an epoxylated natural rubber as a rubber component. In the rubber composition, the epoxylated natural rubber is present in a proportion of 10 mass % to 90 mass % based on the overall amount of the rubber component including the two rubbers. The sheet conveying roller includes a roller body formed from the rubber composition.

8 Claims, 1 Drawing Sheet

(56) References Cited

U.S. PATENT DOCUMENTS

| | | | |
|---|---|---|---|
| 5,447,976 A * | 9/1995 | Curtin et al. | 523/438 |
| 6,737,478 B2 * | 5/2004 | Obrecht et al. | 525/133 |
| 6,919,401 B2 * | 7/2005 | Mabuchi et al. | 524/500 |
| 7,414,087 B2 * | 8/2008 | Kishimoto et al. | 524/495 |
| 7,448,610 B2 * | 11/2008 | Ito et al. | 271/109 |
| 7,866,657 B2 * | 1/2011 | Mine et al. | 271/109 |
| 7,947,782 B2 * | 5/2011 | Hannay et al. | 525/199 |
| 2005/0036038 A1 * | 2/2005 | Wu et al. | 348/222.1 |
| 2005/0043466 A1 * | 2/2005 | Kishimoto et al. | 524/495 |
| 2005/0218582 A1 * | 10/2005 | Mine et al. | 271/109 |
| 2006/0254734 A1 * | 11/2006 | Hannay et al. | 162/134 |
| 2007/0135579 A1 * | 6/2007 | Obrecht et al. | 525/233 |
| 2011/0130259 A1 | 6/2011 | Ito et al. | |
| 2014/0087932 A1 * | 3/2014 | Ito et al. | 492/59 |

FOREIGN PATENT DOCUMENTS

| | | |
|---|---|---|
| JP | 2005-314019 A | 11/2005 |
| JP | 2006-8334 A | 1/2006 |
| JP | 2007-106898 A | 4/2007 |
| JP | 2009-30016 A | 2/2009 |
| JP | 2011-68850 A | 4/2011 |
| JP | 2011-94011 A | 5/2011 |
| JP | 2011-116480 A | 6/2011 |

\* cited by examiner

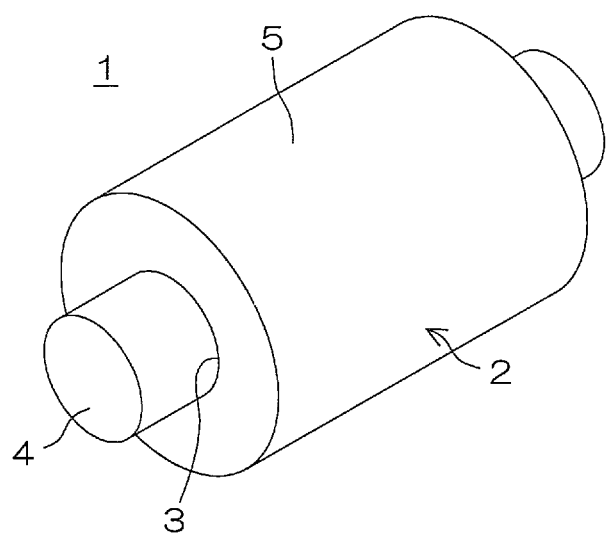

SHEET CONVEYING ROLLER AND RUBBER COMPOSITION

TECHNICAL FIELD

The present invention relates to a sheet conveying roller to be used for conveying sheets in electrostatic copying machines, various types of printers, teller machines and the like, and to a rubber composition for forming the sheet conveying roller.

BACKGROUND ART

Various types of sheet conveying rollers are incorporated in sheet conveying mechanisms provided, for example, in electrostatic copying machines, laser printers, plain paper facsimile machines, copier-printer-facsimile multifunction machines, inkjet printers, automatic teller machines (ATM) and the like.

Examples of the sheet conveying rollers include sheet feed rollers, transport rollers, platen rollers and sheet output rollers, which are each adapted to be rotated in frictional contact with a sheet to convey the sheet. The term "sheet" is herein defined to include a paper sheet, a plastic film sheet and a sheet made of a material other than paper, and this definition is effective in the following description.

Typical examples of a material conventionally used for such a sheet conveying roller include various rubbers such as a natural rubber (NR), a urethane rubber, an ethylene-propylene-diene rubber (EPDM), a polynorbornene rubber, a silicone rubber and a chlorinated polyethylene rubber.

However, paper dust generated from paper sheets is liable to adhere to an outer peripheral surface of the sheet conveying roller. As the sheet conveying roller is repeatedly brought into contact with the paper sheets, the paper dust is accumulated on the outer peripheral surface of the sheet conveying roller. This reduces the friction coefficient of the sheet conveying roller with respect to the paper sheets, thereby causing sheet conveying failure at a relatively early stage.

Particularly, paper sheets having a higher ash content is more liable to generate paper dust, so that the accumulation of the paper dust and the sheet conveying failure attributable to the accumulation of the paper dust are more liable to occur.

It is contemplated that a rubber mixture containing an EPDM, an isoprene rubber (IR) and a styrene butadiene rubber (SBR) in a predetermined ratio is used as a rubber component for formation of the sheet conveying roller (see JP-2011-116480A).

Based on the contemplation, the inventor of the present invention finds that a sheet conveying roller produced by using the three rubbers in combination as the rubber component suppresses the accumulation of the paper dust and the accompanying sheet conveying failure to some extent and ensures proper sheet conveyance for a longer period of time than ever.

However, the effects of the combinational use of the three rubbers as the rubber component are not sufficient. There is still a demand for a sheet conveying roller which prevents the accumulation of the paper dust and the accompanying sheet conveying failure for a longer period of time to ensure proper sheet conveyance.

In the combinational use of the three rubbers as the rubber component, the IR and the SBR are added to the EPDM intrinsically having a smaller friction coefficient in order to improve the initial friction coefficient of the sheet conveying roller. However, the effect of improving the initial friction coefficient is not sufficient.

Of the three rubbers as the rubber component, the EPDM is intrinsically excellent in weather resistance as well known. However, the IR and the SBR each have a carbon-carbon double bond in a main chain thereof and, therefore, are insufficient in weather resistance as compared with the EPDM. This may result in cracking and breakage of the sheet conveying roller during prolonged use of the sheet conveying roller.

Further, the rubber composition has a complicated formulation, because a lot of ingredients including the three rubbers as the rubber component should be blended. This reduces the productivity of the rubber composition and the productivity of the sheet conveying roller to be produced by using the rubber composition, and makes it difficult to control the qualities of the rubber composition and the sheet conveying roller. Further, this increases the production costs.

SUMMARY OF THE INVENTION

Problem to be Solved by the Invention

It is an object of the present invention to provide a sheet conveying roller which requires a smaller number of ingredients than the prior art sheet conveying roller, has an excellent weather resistance and a higher initial friction coefficient, is less liable to suffer from the reduction in friction coefficient attributable to the accumulation of the paper dust and the sheet conveying failure attributable to the reduction in friction coefficient, and ensures proper sheet conveyance for a longer period of time, and to provide a rubber composition for the sheet conveying roller.

Solution to Problem

According to the present invention, there is provided a sheet conveying roller which comprises a rubber composition comprising an EPDM and an epoxylated natural rubber (ENR) as a rubber component, wherein the ENR is present in a proportion of not less than 10 mass % and not greater than 90 mass % based on the overall amount of the rubber component including the two rubbers.

According to the present invention, there is also provided a rubber composition for a sheet conveying roller, the rubber composition comprising an EPDM and an epoxylated natural rubber (ENR) as a rubber component, wherein the ENR is present in a proportion of not less than 10 mass % and not greater than 90 mass % based on the overall amount of the rubber component including the two rubbers.

According to the present invention, the ENR is used in the predetermined proportion in combination with the EPDM instead of the IR and the SBR out of the conventional three rubbers. Thus, the sheet conveying roller has a higher initial friction coefficient, is less liable to suffer from the reduction in friction coefficient attributable to the accumulation of the paper dust and the sheet conveying failure attributable to the reduction in friction coefficient than the prior air sheet conveying roller, and ensures proper sheet conveyance for a longer period of time as apparent from the results for Inventive Examples and Comparative Examples to be described later.

Like the IR and the SBR, the ENR has a carbon-carbon double bond in its main chain. However, the proportion of the carbon-carbon double bond is reduced by introducing an epoxy group into the main chain. Further, the introduced epoxy group per se improves the weather resistance as compared with the IR, the SBR and the like.

According to the present invention, the ENR is used in combination with the EPDM which is intrinsically excellent in weather resistance, whereby the sheet conveying roller is less liable to suffer from the cracking and the breakage during prolonged use.

According to the present invention, the two rubbers, i.e., the EPDM and the ENR, are used in combination as the rubber component, thereby reducing the number of ingredients. This improves the productivity of the rubber composition and the productivity of the sheet conveying roller, thereby facilitating the quality control of the rubber composition and the sheet conveying roller and reducing the production costs.

The rubber composition is preferably crosslinked by a peroxide crosslinking agent.

Unlike a common crosslinking agent for a sulfur vulcanization system, the peroxide crosslinking agent does not require a vulcanization accelerating agent, stearic acid or the like which may form bloom on a surface of the sheet conveying roller to reduce the friction coefficient. The peroxide crosslinking agent per se does not form bloom, eliminating the possibility of the reduction in friction coefficient.

Therefore, the sheet conveying roller has a higher initial friction coefficient, and advantageously suppresses the reduction in friction coefficient and the accompanying sheet conveying failure which may otherwise occur when the roller is repeatedly brought into contact with paper sheets. Thus, the sheet conveying roller can ensure proper sheet conveyance for a longer period of time.

Effects of the Invention

According to the present invention, the sheet conveying roller can be provided, which is produced by using a smaller number of ingredients, has an excellent weather resistance and a higher initial friction coefficient, is less liable to suffer from the reduction in friction coefficient attributable to the accumulation of the paper dust and the accompanying sheet conveying failure, and ensures proper sheet conveyance for a longer period of time. Further, the rubber composition can be provided for the sheet conveying roller.

BRIEF DESCRIPTION OF THE DRAWING

FIG. 1 is a perspective view showing an exemplary sheet conveying roller according to an embodiment of the present invention.

EMBODIMENTS OF THE INVENTION

Rubber Composition

An inventive rubber composition contains an EPDM and an ENR as a rubber component, and the ENR is present in the rubber composition in a proportion of not less than 10 mass % and not greater than 90 mass % based on the overall amount of the rubber component including these two rubbers.

In the present invention, the proportion of the ENR is limited to the aforementioned range for the following reasons:

If the proportion of the EPDM is less than the aforementioned range, the sheet conveying roller has poorer weather resistance and, therefore, is liable to suffer from cracking and breakage during prolonged use. Further, the sheet conveying roller has poorer abrasion resistance and, therefore, is more liable to be abraded when it is repeatedly brought into contact with paper sheets. The abrasion reduces the friction coefficient of the roller, thereby resulting in the sheet conveying failure.

On the other hand, if the proportion of the ENR is less than the aforementioned range, it is impossible to provide the effects of the combinational use of the ENR and the EPDM, i.e., the effect of improving the initial friction coefficient and the effect of ensuring proper sheet conveyance for a longer period of time while suppressing the reduction in friction coefficient and the accompanying sheet conveying failure which may otherwise occur due to the accumulation of the paper dust when the roller is repeatedly brought into contact with the paper sheets.

In order to provide a sheet conveying roller which has further excellent weather resistance and a higher initial friction coefficient and ensures proper sheet conveyance for a longer period of time, the proportion of the ENR is preferably not less than 15 mass % and not greater than 80 mass %, particularly preferably not greater than 70 mass %, in the aforementioned range.

(EPDM)

Usable examples of the EPDM include copolymers obtained by copolymerizing ethylene, propylene and a diene. Examples of the diene include ethylidene norbornene (ENB) and dicyclopentadiene (DCPD).

A so-called oil-extension EPDM extended with an extension oil or a non-oil-extension EPDM not extended with an extension oil may be used as the EPDM. In consideration of the handling ease in adding an additive such as a crosslinking agent to the rubber component including the two rubbers and kneading the resulting mixture for preparation of the rubber composition and the working ease in forming the rubber composition into the sheet conveying roller, the EPDM is preferably an oil-extension EPDM.

Exemplary ENB-type oil-extension EPDMs in which the diene is the ENB include ESPRENE (registered trade name) 670F (having a mass ratio of rubber:extension oil=100:100) and ESPRENE 671F (having a mass ratio of rubber:extension oil=100:70) available from Sumitomo Chemical Co., Ltd., and MITSUI EPT3042E (having a mass ratio of rubber:extension oil=100:120) available from Mitsui Chemicals, Inc. These ENB-type oil-extension EPDMs may be used either alone or in combination.

An exemplary DCPD-type oil-extension EPDM in which the diene is the DCPD is ESPRENE 400 (having a mass ratio of rubber:extension oil=100:100) available from Sumitomo Chemical Co., Ltd.

The above examples of the EPDM may be used either alone or in combination.

Where any of the oil-extension EPDMs is used as the EPDM, the proportion of the ENR described above is based on the total amount of the rubber (EPDM) contained in the oil-extension EPDM and the ENR.

(ENR)

Usable examples of the ENR include those obtained by randomly epoxylating carbon-carbon double bonds in a main chain of a natural rubber, for example, by a chlorohydrin method, a direct oxidation method, a hydrogen peroxide method, an alkylhydroperoxide method, a peroxidation method or the like.

The epoxylation degree of the ENR may be arbitrarily set.

In order to further improve the aforementioned effects of the combinational use of the EPDM and the ENR for the production of the sheet conveying roller, the epoxylation degree is preferably not less than 4 mol % and not greater than 60 mol %, particularly preferably not less than 10 mol % and not greater than 50 mol %.

Examples of the epoxylated natural rubber include ENR10 (having an epoxylation degree of 10 mol %), ENR25 (having an epoxylation degree of 25 mol %) and ENR50 (having an epoxylation degree of 50 mol %) available from Sime Darby Berhad in Malaysia. These epoxylated natural rubbers may be used either alone or in combination.

<Crosslinking Agent>

A crosslinking agent for crosslinking the rubber component is blended in the rubber composition.

A common crosslinking agent for a sulfur vulcanization system (which employs sulfur or a sulfur-containing compound, a vulcanization accelerating agent and a vulcanization acceleration assisting agent in combination) may be used as the crosslinking agent, but a peroxide crosslinking agent is particularly preferred.

Unlike the common crosslinking agent for the sulfur vulcanization system, the peroxide crosslinking agent does not require the combinational use of the vulcanization accelerating agent, stearic acid (vulcanization acceleration assisting agent) or the like which may form bloom on a surface of the sheet conveying roller to reduce the friction coefficient. In addition, the peroxide crosslinking agent per se does not form bloom, eliminating the possibility of the reduction in friction coefficient.

Therefore, the sheet conveying roller advantageously suppresses the reduction in friction coefficient and the accompanying sheet conveying failure which may otherwise occur when the roller is repeatedly brought into contact with paper sheets. Thus, the sheet conveying roller can ensure proper sheet conveyance for a longer period of time.

Examples of the peroxide crosslinking agent include benzoyl peroxide, 1,1-bis(tert-butylperoxy)-3,3,5-trimethylcyclohexane, 2,5-dimethyl-2,5-di(benzoylperoxy)hexane, di(tert-butylperoxy)diisopropylbenzene, 1,4-bis[(tert-butyl)peroxyisopropyl]benzene, di(tert-butylperoxy)benzoate, tert-butylperoxybenzoate, dicumyl peroxide, tert-butyl cumyl peroxide, 2,5-dimethyl-2,5-di(tert-butylperoxy)hexane, di-tert-butyl peroxide and 2,5-dimethyl-2,5-di(tert-butylperoxy)-3-hexene, which may be used either alone or in combination.

The proportion of the peroxide crosslinking agent to be blended is preferably not less than 0.8 parts by mass and not greater than 5 parts by mass, particularly preferably not less than 1.5 parts by mass and not greater than 3.5 parts by mass, based on 100 parts by mass of the rubber component.

If the proportion of the peroxide crosslinking agent is less than the aforementioned range, the abrasion resistance of the sheet conveying roller is liable to be reduced. If the proportion of the peroxide crosslinking agent is greater than the aforementioned range, the sheet conveying roller has an excessively high hardness, failing to exhibit a desired friction coefficient.

As required, various additives including a reinforcing agent/filler such as carbon black, an oil and a plasticizer may be blended in the rubber composition.

<Sheet Conveying Roller>

FIG. 1 is a perspective view showing an exemplary sheet conveying roller 1 according to an embodiment of the present invention.

Referring to FIG. 1, the exemplary sheet conveying roller 1 includes a hollow cylindrical roller body 2 formed from the rubber composition described above, and a shaft 4 inserted through a center hole 3 of the roller body 2. The shaft 4 is made of, for example, a metal, a ceramic, a hard resin or the like.

The rubber thickness of the roller body 2 is not particularly limited but, in the case of a sheet conveying roller for an electrostatic copying machine or the like, is preferably not less than 1 mm and not greater than 20 mm, particularly preferably not less than 2 mm and not greater than 15 mm, in order to ensure proper sheet conveyance.

The roller body 2 is produced by forming the aforementioned rubber composition into a hollow cylindrical shape by a given forming/molding method such as an injection molding method or an extrusion method, and then crosslinking the rubber component of the resulting product, for example, by a press crosslinking method or the like.

The roller body 2 and the shaft 4 are combined together, for example, by allowing the shaft 4 to have an outer diameter greater than the inner diameter of the hole 3 of the roller body 2 and forcibly inserting the shaft 4 into the hole 3, by bonding the roller body 2 and the shaft 4 to each other with an adhesive agent, or by bonding the roller body 2 and the shaft 4 to each other with a vulcanization adhesive agent by vulcanization when the rubber component of the roller body 2 is vulcanized.

At given time before or after the roller body 2 and the shaft 4 are combined together, as required, an outer peripheral surface 5 of the roller body 2 may be polished to a predetermined surface roughness, knurled or textured, or longitudinally opposite end portions of the roller body 2 may be cut so that the roller body 2 has a predetermined axial length or the sheet conveying roller 1 has a predetermined roller width. Thus, the sheet conveying roller 1 is produced as shown in FIG. 1.

The roller body 2 may have a double layer structure including an outer layer adjacent to an outer peripheral surface 5, and an inner layer adjacent to the shaft 4. In this case, at least the outer layer is formed from the rubber composition.

Depending on the use purpose of the sheet conveying roller 1, the hole 3 may be provided at a position eccentric to the center of the roller body 2. The roller body 2 may have an odd shape rather than a cylindrical shape. For example, the roller body 2 may be configured such that the outer peripheral surface 5 is partly cut into a flat shape. The roller body 2 having an odd shape may be produced by forming or molding the resin composition directly into the odd shape by an injection molding method, an extrusion method or the like, or by post-processing the outer peripheral surface 5 of the cylindrical roller body 2.

Further, the roller body 2 may be configured in the odd shape by deforming the shaft 4 into an odd sectional shape corresponding to the odd shape and then inserting the deformed shaft 4 into the hole 3 of the cylindrical roller body 2. In this case, the outer peripheral surface 5 of the cylindrical roller body 2 can be subjected to the polishing process, the knurling process or the texturing process before the deformation of the cylindrical roller body 2 and, therefore, the processability can be improved.

The inventive sheet conveying roller 1 can be used as any of various sheet conveying rollers such as a sheet feed roller, a transport roller, a platen roller and a sheet output roller to be incorporated in a sheet conveying mechanism provided, for example, in an electrostatic copying machine, a laser beam printer, a plain paper facsimile machine, an inkjet printer, an automatic teller machine (ATM) or the like.

EXAMPLES

Example 1

First, 40 parts by mass of an oil-extension EPDM (aforementioned Sumitomo Chemical's ESPRENE 670F having a mass ratio of rubber:extension oil=100:100) (20 parts by mass of EPDM as a rubber) and 80 parts by mass of an ENR (aforementioned Sime Darby's ENR25 having an epoxylation degree of 25 mol %) as a rubber component, 3 parts by mass of dicumyl peroxide (PERCUMYL (registered trade name) D available from NOF Corporation) as a peroxide crosslinking agent, 10 parts by mass of carbon black (HAF available under the trade name of SEAST 3 from Tokai Carbon Co., Ltd.) as a reinforcing agent/filler, and 60 parts by mass of paraffin oil (DIANA (registered trade name) PROCESS OIL PW-380 available from Idemitsu Kosan Co., Ltd.) were blended together and kneaded. Thus, a rubber composition was prepared.

In turn, the rubber composition was extruded into a tubular shape, and press-vulcanized at 160° C. for 30 minutes to be molded into a tubular body (cot) having an inner diameter of 12.6 mm, an outer diameter of 25 mm and a length of 60 mm. Then, the tubular body was ground to an outer diameter of 24 mm by a tube grinder, and cut to a length of 30 mm. Thus, a hollow cylindrical roller body was produced.

A resin shaft (special resin core) having a diameter of 14 mm was forcibly inserted into a hole of the roller body. Thus, a sheet conveying roller was produced.

In the rubber composition, the ENR was present in a proportion of 80 mass % based on the overall amount of the rubber component.

Example 2

A rubber composition was prepared in substantially the same manner as in Example 1, except that the proportion of the oil-extension EPDM was 100 parts by mass (i.e., 50 parts by mass of the EPDM as a rubber), the proportion of the ENR was 50 parts by mass and the proportion of the paraffin oil was 30 parts by mass. Then, a sheet conveying roller was produced by using the rubber composition.

In the rubber composition, the ENR was present in a proportion of 50 mass % based on the overall amount of the rubber component.

Example 3

A rubber composition was prepared in substantially the same manner as in Example 1, except that the proportion of the oil-extension EPDM was 140 parts by mass (i.e., 70 parts by mass of the EPDM as a rubber), the proportion of the ENR was 30 parts by mass and the proportion of the paraffin oil was 10 parts by mass. Then, a sheet conveying roller was produced by using the rubber composition.

In the rubber composition, the ENR was present in a proportion of 30 mass % based on the overall amount of the rubber component.

Example 4

A rubber composition was prepared in substantially the same manner as in Example 3, except that 1 part by mass of sulfur powder (available from Tsurumi Chemical Industry Co., Ltd.), 2 parts by mass of tetraethylthiuram disulfide (vulcanization acceleration assisting agent available under NOCCELER (registered trade name) TET from Ouchi Shinko Chemical Industrial Co., Ltd.), 1 part by mass of di-2-benzothiazolyl disulfide (vulcanization acceleration assisting agent available under NOCCELER DM from Ouchi Shinko Chemical Industrial Co., Ltd.), 1 part by mass of stearic acid (available under the trade name of TSUBAKI from NOF Corporation) and 5 parts by mass of ZINC OXIDE TYPE 2 (available from Mitsui Mining & Smelting Co., Ltd.) were blended together. Then, a sheet conveying roller was produced by using the rubber composition.

In the rubber composition, the ENR was present in a proportion of 30 mass % based on the overall amount of the rubber component.

Example 5

A rubber composition was prepared in substantially the same manner as in Example 1, except that the proportion of the oil-extension EPDM was 180 parts by mass (i.e., 90 parts by mass of the EPDM as a rubber), the proportion of the ENR was 10 parts by mass, the proportion of carbon black was 15 parts by mass and the paraffin oil was not blended. Then, a sheet conveying roller was produced by using the rubber composition.

In the rubber composition, the ENR was present in a proportion of 10 mass % based on the overall amount of the rubber component.

Comparative Example 1

A rubber composition was prepared in substantially the same manner as in Example 1, except that 40 parts by mass of an oil-extension EPDM (aforementioned Sumitomo Chemical's ESPRENE 670F having a mass ratio of rubber component:extension oil=100:100) (i.e., 20 parts by mass of EPDM as a rubber), 50 parts by mass of a natural rubber (SMR (Standard Malaysian Rubber)-CV60) and 30 parts by mass of an SBR (non-oil-extension SBR available under NIPOLE (registered trade name) 1502 from Nippon Zeon Corporation) were used in combination as the rubber component. Then, a sheet conveying roller was produced by using the rubber composition.

Comparative Example 2

A rubber composition was prepared in substantially the same manner as in Example 1, except that the proportion of the oil-extension EPDM was 10 parts by mass (i.e., 5 parts by mass of the EPDM as a rubber), the proportion of the ENR was 95 parts by mass and the proportion of the paraffin oil was 75 parts by mass. Then, a sheet conveying roller was produced by using the rubber composition.

In the rubber composition, the ENR was present in a proportion of 95 mass % based on the overall amount of the rubber component.

Comparative Example 3

A rubber composition was prepared in substantially the same manner as in Example 1, except that the proportion of the oil-extension EPDM was 190 parts by mass (i.e., 95 parts by mass of the EPDM as a rubber), the proportion of the ENR was 5 parts by mass, the proportion of the carbon black was 18 parts by mass and the paraffin oil was not blended. Then, a sheet conveying roller was produced by using the rubber composition.

In the rubber composition, the ENR was present in a proportion of 5 mass % based on the overall amount of the rubber component.

<Friction Coefficient Test and Sheet Conveying State Evaluation>

The sheet conveying rollers of Examples and Comparative Examples were each brought into pressure contact with a paper sheet (Xerox Business 4200 available from Xerox Corporation) having a width of 60 mm and a length of 210 mm and placed on a Teflon (registered trade name) plate with a vertical load of 340 gf and, in this state, were rotated at a circumferential speed of 105 mm/sec. At this time, a transportation force F applied to the paper sheet was measured by a load cell, and a friction coefficient μ was determined from the following expression (4):

$$\mu = F/340 \quad (4)$$

The measurement was performed immediately after the production of the sheet conveying rollers (initial measurement). Further, the sheet conveying rollers were each incorporated as a sheet feed roller in a laser printer HP Laser Jet 4350n available from Japan Hewlett Packard Co., Ltd., and 12,000 paper sheets (Xerox Business 4200 available from Xerox Corporation) were conveyed. Thereafter, the measurement was performed (post-endurance measurement).

Further, a sheet conveying state was observed, and evaluated based on the following criteria.

X (Unacceptable sheet conveying state): Sheet conveying failure occurred ten or more times during conveyance of 12,000 paper sheets.
○ (Acceptable sheet conveying state): Sheet conveying failure occurred once to nine times during conveyance of 12,000 paper sheets.
◎ (Excellent sheet conveying state): No sheet conveying failure occurred during conveyance of 12,000 paper sheets.

<Weather Resistance Test>

The weather resistance of each of the sheet conveying rollers of Examples and Comparative Examples was determined in conformity with Static Ozone Degradation Test specified by "Rubber, vulcanized or thermoplastics—Determination of ozone resistance" in JIS K6259:2004.

Test strips each dimensioned and configured as specified by the above standards were formed from the same rubber compositions as prepared in Examples and Comparative Examples. The test strips were each exposed to ozone at a temperature of 40° C. at an ozone concentration of 50 ppm for a test period of 120 hours, while being elongated with a tensile elongation strain (10% elongation). Then, the test strips were each checked for cracking. The test strips were each evaluated for weather resistance based on the following criteria.

X (Unacceptable weather resistance): Cracking occurred during 96-hour exposure.
○ (Acceptable weather resistance): Cracking did not occur during 96-hour exposure, but occurred during 120-hour exposure after a lapse of 96 hours.
◎ (Excellent weather resistance): No cracking occurred during 120-hour exposure.

The results are shown in Tables 1 and 2.

TABLE 1

|  | Comparative Example 1 | Comparative Example 2 | Example 1 | Example 2 |
|---|---|---|---|---|
| Parts by mass | | | | |
| Rubber component | | | | |
| Oil-extension EPDM | 40 (20) | 10 (5) | 40 (20) | 100 (50) |
| ENR | — | 95 | 80 | 50 |
| NR | 50 | — | — | — |
| SBR | 30 | — | — | — |
| Proportion of ENR (mass %) | — | 95 | 80 | 50 |
| Carbon black | 10 | 10 | 10 | 10 |
| Paraffin oil | 60 | 75 | 60 | 30 |
| Crosslinking agent | | | | |
| Peroxide | 3 | 3 | 3 | 3 |
| Sulfur vulcanization system | — | — | — | — |
| Evaluation | | | | |
| Friction coefficient | | | | |
| Initial | 2.4 | 2.6 | 2.6 | 2.5 |
| Post-endurance | 1.7 | 1.8 | 1.9 | 1.8 |
| Initial-post-endurance | 0.7 | 0.8 | 0.7 | 0.7 |
| Sheet conveying state | ◎ | ◎ | ◎ | ◎ |
| Weather resistance | X | X | ○ | ◎ |

TABLE 2

|  | Example 3 | Example 4 | Example 5 | Comparative Example 3 |
|---|---|---|---|---|
| Parts by mass | | | | |
| Rubber component | | | | |
| Oil-extension EPDM | 140 (70) | 140 (70) | 180 (90) | 190 (95) |
| ENR | 30 | 30 | 10 | 5 |
| NR | — | — | — | — |
| SBR | — | — | — | — |
| Proportion of ENR (mass %) | 30 | 30 | 10 | 5 |
| Carbon black | 10 | 10 | 15 | 18 |
| Paraffin oil | 10 | 10 | — | — |
| Crosslinking agent | | | | |
| Peroxide | 3 | — | 3 | 3 |
| Sulfur vulcanization system | — | 10 | — | — |
| Evaluation | | | | |
| Friction coefficient | | | | |
| Initial | 2.4 | 2.3 | 2.2 | 2.0 |
| Post-endurance | 1.8 | 1.7 | 1.7 | 1.2 |
| Initial-post-endurance | 0.6 | 0.6 | 0.5 | 0.8 |
| Sheet conveying state | ◎ | ◎ | ○ | X |
| Weather resistance | ◎ | ◎ | ◎ | ◎ |

The results for Examples 1 to 5 and Comparative Example 1 shown in Tables 1 and 2 indicate that the combinational use of the two rubbers (i.e., the EPDM and the ENR) as the rubber component makes it possible to provide a sheet conveying roller which has excellent weather resistance and a higher initial friction coefficient, is less liable to suffer from the reduction in friction coefficient attributable to the accumulation of paper dust and the sheet conveying failure attributable to the reduction in friction coefficient, and ensures proper sheet conveyance for a longer period of time.

However, the results for Examples 1 to 5 and Comparative Examples 2 and 3 indicate that the proportion of the ENR based on the total amount of the EPDM and the ENR should be not less than 10 mass % and not greater than 90 mass % in order to provide the aforementioned effects.

The results for Examples 1 to 5 indicate that the proportion of the ENR based on the total amount of the EPDM and the ENR is preferably not less than 15 mass % and not greater than 80 mass %, particularly preferably not greater than 70 mass %, within the aforementioned range in order to further improve the aforementioned effects.

Further, the results for the Examples 3 and 4 indicate that the use of the peroxide crosslinking agent improves the initial friction coefficient as compared with the use of the crosslinking agent for the sulfur vulcanization system.

DESCRIPTION OF REFERENCE CHARACTERS

1: Sheet conveying roller
2: Roller body
3: Hole
4: Shaft
5: Outer peripheral surface This application corresponds to Japanese Patent Application No. 2011-235261 filed in the Japan Patent Office on Oct. 26, 2011, the disclosure of which is incorporated herein by reference in its entirety.

What is claimed is:

1. A sheet conveying roller which comprises a rubber composition as a rubber component that includes an ethylene-propylene-diene rubber (EPDM), an epoxylated natural rubber (ENR), and no other rubber, wherein the ENR is present in a proportion of not less than 10 mass % and not greater than 80 mass % based on an overall amount of the rubber component including the two rubbers.

2. The sheet conveying roller according to claim 1, wherein the proportion of the epoxylated natural rubber (ENR) is not less than 30 mass % and not greater than 50 mass %.

3. The sheet conveying roller according to claim 2, wherein the rubber composition is crosslinked by a peroxide crosslinking agent.

4. The sheet conveying roller according to claim 1, wherein the rubber composition is crosslinked by a peroxide crosslinking agent.

5. The sheet conveying roller according to claim 1, comprising a hollow cylindrical roller body formed from the rubber composition, wherein the roller body has a thickness of not less than 1 mm and not greater than 20 mm.

6. The sheet conveying roller according to claim 5, wherein the thickness of the roller body is not less than 2 mm and not greater than 15 mm.

7. A rubber composition for a sheet conveying roller, the rubber composition including as a rubber component an ethylene-propylene-diene rubber (EPDM), an epoxylated natural rubber (ENR), and no other rubber, wherein the ENR is present in a proportion of not less than 10 mass % and not greater than 80 mass % based on an overall amount of the rubber component including the two rubbers.

8. The rubber composition for the sheet conveying roller according to claim 7, wherein the proportion of the epoxylated natural rubber (ENR) is not less than 30 mass % and not greater than 50 mass %.

* * * * *